United States Patent [19]
Cousins et al.
[11] Patent Number: 5,055,830
[45] Date of Patent: Oct. 8, 1991

[54] BATTERY SENSING MECHANISM

[75] Inventors: Otto J. Cousins, Burbank; Thomas E. Paulick, Aurora; James H. Woodburn, Batavia; Ronald Sisselman, Aurora, all of Ill.

[73] Assignee: Pittway Corporation, Northbrook, Ill.

[21] Appl. No.: 365,085

[22] Filed: Jun. 12, 1989

[51] Int. Cl.$^5$ ........................ G08B 23/00; H01M 2/10

[52] U.S. Cl. .................................... 340/693; 116/315; 429/96

[58] Field of Search ........................ 340/693, 628-630, 340/636, 568; 116/315; 429/96-100; 324/426

[56] References Cited

U.S. PATENT DOCUMENTS

| | | | |
|---|---|---|---|
| 3,823,367 | 7/1974 | Kaye et al. | 324/426 |
| 3,887,393 | 6/1975 | La Rue, Jr. | 429/99 |
| 4,228,428 | 10/1980 | Niedermeyer | 340/628 |
| 4,471,346 | 9/1984 | Nelson et al. | 340/628 |
| 4,525,703 | 6/1985 | Bellino | 340/628 |
| 4,870,395 | 9/1989 | Belano | 340/693 |
| 4,881,063 | 11/1989 | Fawcett | 340/693 |
| 4,959,640 | 9/1990 | Hall | 340/693 |

*Primary Examiner*—Glen R. Swann III
*Assistant Examiner*—Thomas J. Mullen, Jr.
*Attorney, Agent, or Firm*—Dressler, Goldsmith, Shore, Sutker & Milnamow, Ltd.

[57] ABSTRACT

A smoke detector with a visual battery missing indicator and a removable cover includes first and second locking prongs molded in the detector and directed toward the cover. A battery is positionable between the first and second locking prongs deflecting same from a non-locking position to a locking position. In the locking position, free ends of the prongs can engage the cover, locking same to the detector. In the non-locking position, the prongs are not effective to engage the cover. If the detector is mounted on a ceiling, the non-engaged cover will not remain closed. In an alternate embodiment usable with a bracket mounted detector, a depressible blocking member is located adjacent a region where the detector is normally coupled to a portion of the bracket. In the presence of a battery this member is retracted, enabling the unit to be attached to the bracket. In the absence of a battery, this member is extended and the detector cannot be attached to the bracket.

24 Claims, 7 Drawing Sheets

BATTERY SENSING MECHANISM

FIELD OF THE INVENTION

The invention pertains to smoke detectors and the like. More particularly, the invention pertains to battery powered smoke detectors and an apparatus for indicating the absence of a battery.

BACKGROUND OF THE INVENTION

Smoke detectors are very commonly found today in buildings of all types. Some of these smoke detectors are AC powered. Others are battery powered. Some include a combination of AC power and battery backup power.

Battery powered detectors, while very convenient and easy to install, have suffered from the drawback that a user of the building might not realize the unit needed a battery. As such, because there was no indicia of a missing battery, this condition could persist for a substantial period of time to and including the time when a fire strikes the building. At that point in time, the detector would of course not function and not give out the warning it was intended to provide.

This problem has been dealt with in at least two different ways in the prior art. In a one known prior art detector the battery is located in a drawer which is radially movable with respect to the base.

So long as the battery is positioned in the drawer, the drawer can be freely opened and closed. When the drawer is closed with the battery present, the detector can receive electrical energy from the battery.

When the battery is removed from the drawer, the drawer is locked open and cannot be closed. This provides a visual indication of the missing battery.

While the drawer approach does provide an acceptable solution to the battery indicator problem from a consumer's point of view, from a manufacturer's point of view, it tends to be rather expensive and complicated.

An alternate prior art battery missing indicator has been incorporated into a smoke detector which is intended to be removably affixed to a surface mounted bracket. The bracket might be mounted on the ceiling or the wall of a room.

In this detector, when no battery is installed in the unit, a movable obstruction member extends out of a portion of the base which is intended to be located adjacent the bracket.

The presence of the extending obstruction is intended to make it impossible to couple the detector to the bracket. When a battery is inserted into the base of the detector, the obstructing member is depressed within the base of the detector by the battery. The detector can then be coupled to the bracket.

The above solution is of course not usable with detectors which are directly mountable on a surface without a bracket.

Thus, there continues to be a need for a costeffective and reliable battery indicator apparatus which can be incorporated into electrical units such as battery powered smoke detectors. In addition, there continues to be a need for a simple apparatus of this type which readily conveys, visually, the missing battery indication to anybody passing through or in the area where the detector is mounted.

SUMMARY OF THE INVENTION

In accordance with the invention, an electrical unit which can be powered at least in part by a battery includes a battery missing indicator. The unit, which for example could be, but is not limited to, a battery powered smoke detector, has a base with an openable cover.

The base includes a deflectable member which is deflected from a non-locking position, in the absence of battery, to a locking position in the presence of the battery. A complementary engaging member is carried by the openable cover.

When the cover is placed in position on the unit, assuming that the battery is present, the cover can be locked to the unit. When the cover is placed in position on the unit, and the battery is missing, the nondeflected state of the engaging member keeps the cover from being locked to the base.

The base of the unit can include first and second spaced-apart locking members. The locking members can receive the battery therebetween.

The battery deflects the first and second locking members, as a result, free ends thereof can engage and lock the cover to the base in response to the presence of the battery.

In an alternate embodiment, the electrical unit can be formed with a two-part base. For example, and without limitation, a first part of the base can be formed as a surface mountable bracket.

The second part of the base can include a battery receiving region. When a battery has been inserted into that region, a locking member carried by the second part of the base is deflected to a base engaging position. The second part of the base can then be rotatably coupled to the first part of the base. In the absence of a battery, the locking member is forced, by a biasing spring, into a blocking position and the second part of the base cannot be coupled to the first part.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENTS

Figure 1:
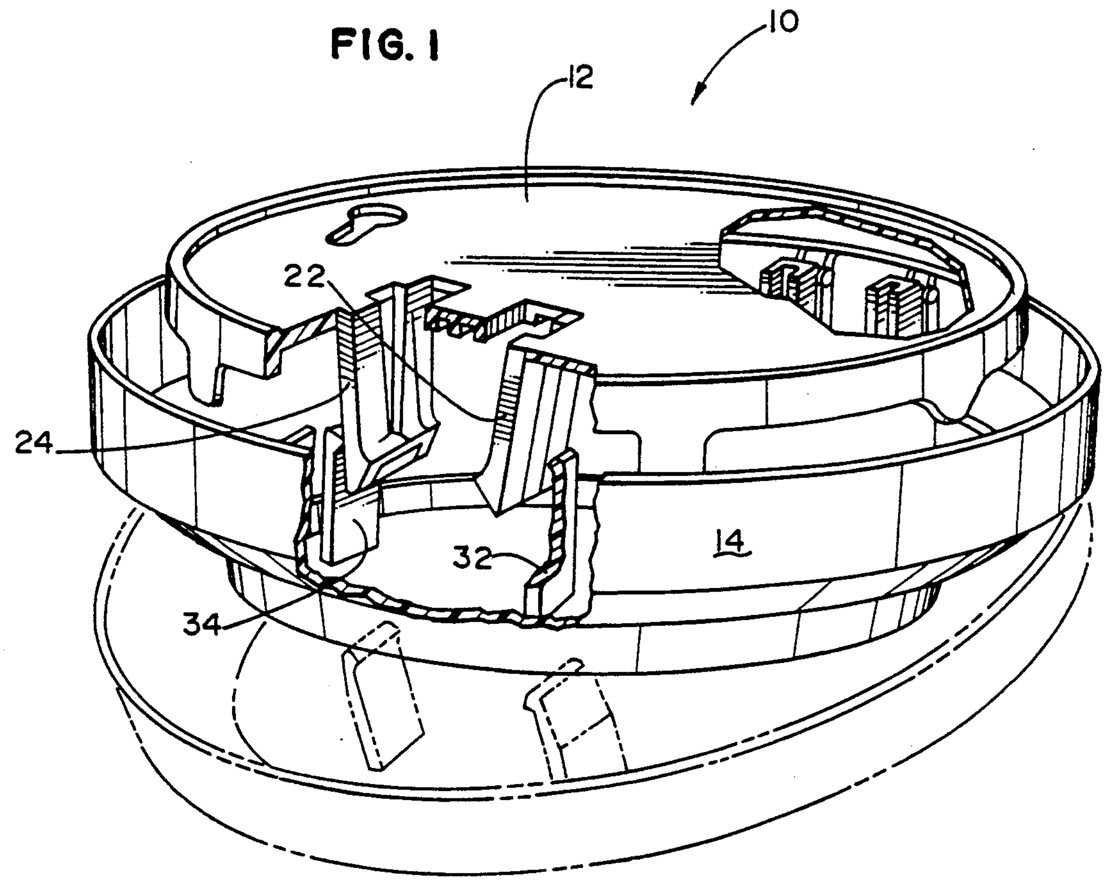
FIG. 1 is a partly broken-away view in perspective of a smoke detector in accordance with the present invention illustrating the characteristic of the cover hanging open in the absence of a battery.

While this invention is susceptible of embodiment in many different forms, there is shown in the drawings and will be described herein in detail a specific embodiment thereof with the understanding that the present disclosure is to be considered as an exemplification of the principles of the invention and is not intended to limit the invention to the specific embodiment illustrated.

In a first embodiment, a battery powered smoke detector 10 is disclosed which incorporates a battery missing indicator. The detector 10 has a latch mechanism which, in the absence of a battery, inhibits latching of a cover to the detector. Where the detector is mounted on a wall or a ceiling, the unlatched cover hangs from the detector or falls from the detector under the influence of gravity if not properly latched thereto. This provides a visible indicator of the missing battery.

With respect to the figures, FIGS. 1–4 illustrate the detector 10. The detector 10 has a base 12 and a cover 14. Both the base 12 and cover 14 can be molded of commercially available plastics.

Smoke detectors of various types are well-known. For example, U.S. Pat. No. 4,626,695, assigned to the assignee of the present invention, entitled "Photoelectric Composition Products Detector With Low-Power Consumption and Improved Noise Immunity" discloses circuitry and related apparatus for use in a photoelectric-type detector. U.S. Pat. No. 4,488,044 entitled "Ionization Chamber for Smoke Detector and the Like," assigned to the assignee of the present invention, discloses an ionization-type smoke detector. The disclosures of the '695 and '044 patents are hereby incorporated herein by reference.

The detector 10, which could be either an ionization-type or a photoelectric-type detector, is intended to be directly attached to a mounting surface via the base 12. The mounting surface can be either a ceiling or a wall.

The cover 14 can be opened for the purpose of replacing the battery B which at least in part powers the detector. The detector 10 can be completely powered by the battery B or it could be an AC powered unit with only battery backup. The cover 14 can be attached to the base 12 by means of a hinge or can be completely removable therefrom.

Figure 2:
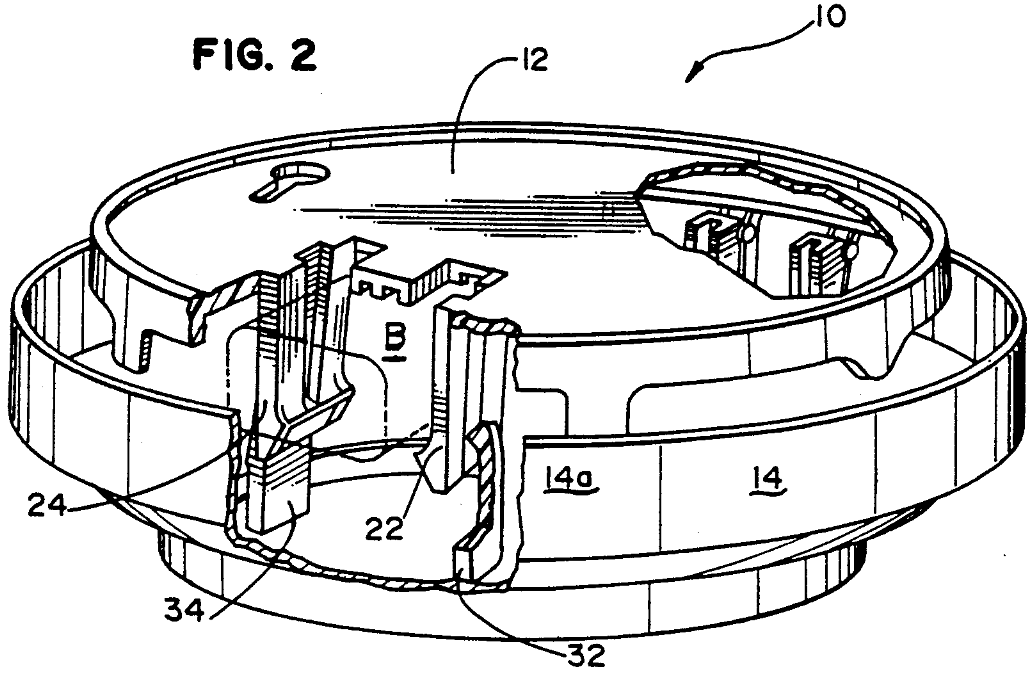
FIG. 2 is a perspective view in accordance with the present invention with the cover locked closed in the presence of a battery.

In FIG. 1, the battery is missing and, as illustrated, the cover 14 will not latch to the base 12. This provides a visual indicium of a missing battery. In FIG. 2, the battery B is present and the cover 14 is locked to the base 12.

Figure 3:
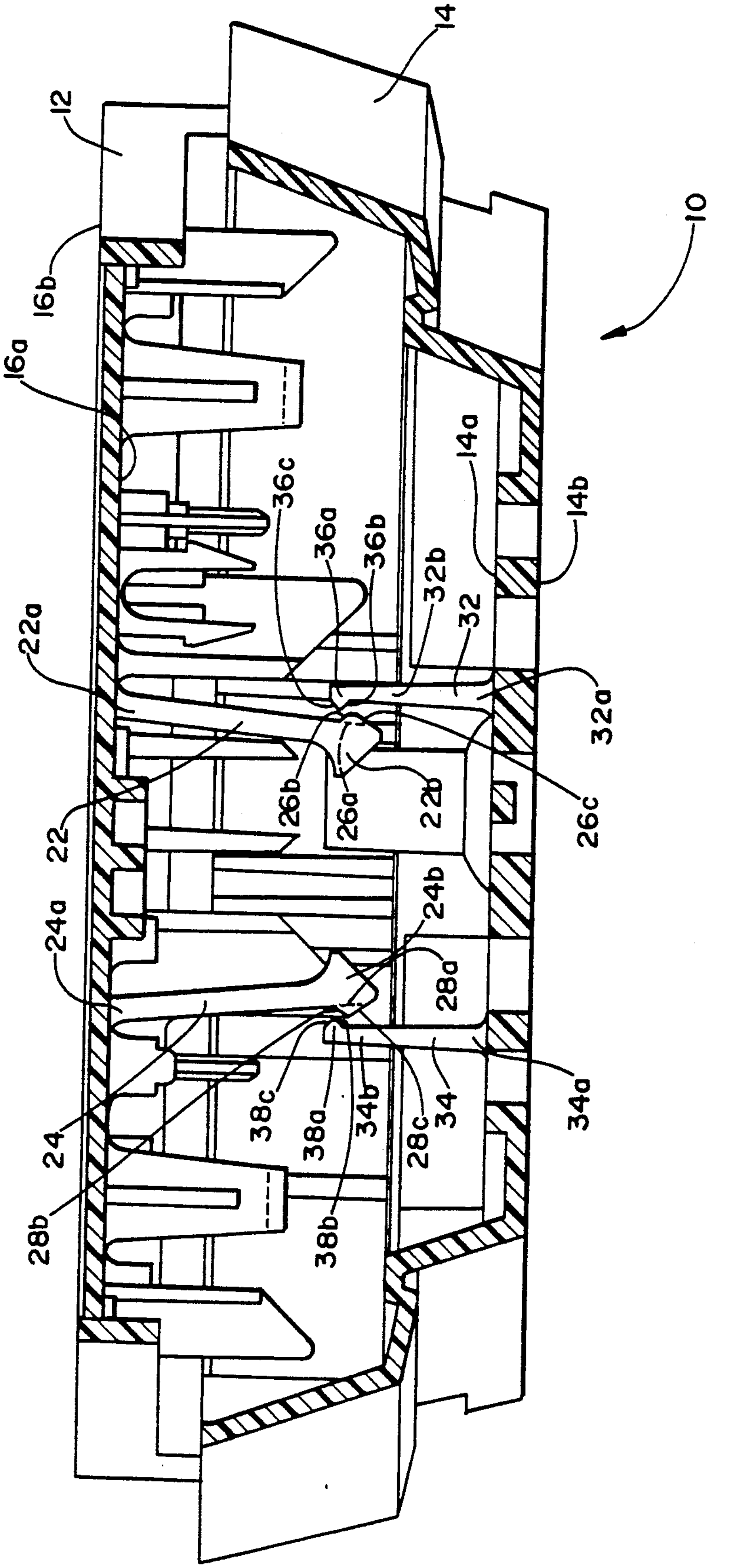
FIG. 3 is an enlarged view partly in section illustrating the locking mechanism and the interrelationships thereof in the absence of a battery.

With respect to FIG. 3, the base 12 is formed with an interior surface **16*a* and an exterior surface 16*b*. The exterior surface 16*b*** is positioned adjacent the mounting surface.

Carried on the interior surface **16*a* is a battery receiving region 18. In the detector 10, the battery receiving region 18 is fixed and is not movable with respect to the base 12**.

Adjacent the battery receiving region 18 are first and second flexible, elongated battery retaining members 22, 24. The members 22 and 24 are integrally molded with the base 12.

Each of the retaining members 22 or 24 has a first end **22*a*, 24*a* at which the respective member is attached to the base 12. Each retaining member has a second, free end 22*b*, 24*b***.

Each of the battery retaining members 22 or 24 carries, adjacent the respective second end, a laterally extending protrusion, **26*a* or 28*a*. The purpose of the protrusion 26*a* or 28*a* is to provide means for coupling the cover 14 to the base 12** in the presence of the battery B.

Each respective protrusion **26*a* or 28*a* has a locking surface 26*b* or 28*b*. In addition, each has a deflecting surface 26*c* or 28*c*. As described in more detail subsequently, the locking surfaces and the deflecting surfaces interact with members carried by the cover 14 for the purpose of coupling that cover to the base 12**.

The cover 14, which also can be molded of a variety of commercially available plastics has an internal surface **14*a* and an external surface 14*b*. Integrally molded with and attached to the surface 14*a* are spaced-apart elongated, deflectable cover locking members 32 and 34**.

Each of the cover locking members 32 and 34 has a first end **32*a*, 34*a* at which the respective locking member is connected to the cover 14. In addition, each locking member has a free second end 32*b*, 34*b***.

Each of the second ends carries a laterally extending locking, engaging prong **36*a*, 38*a*. Each of the locking engaging prongs has a locking surface 36*b*, 38*b* as well as a respective deflecting surface 36*c* and 38*c***.

The detector 10 would also include standard types of combustion product detector circuitry as disclosed in either the '044 or '695 patents incorporated herein by reference. The exact details of such circuitry are not a limitation of the present invention.

As illustrated in FIGS. 1–4, in the absence of the battery B, the battery retaining members 22, 24 are inwardly oriented with respect to the cover locking members 32, 34 and do not engage same. Hence, in this condition, the cover 14 is not locked to the base 12, thereby providing a visual indication of the missing battery. In this instance, the cover will either hang open with respect to the base 12 and will not stay closed or if the cover 14 is not hinged on the base 12, it will fall off of the base 12 under the influence of gravity.

Figure 4:
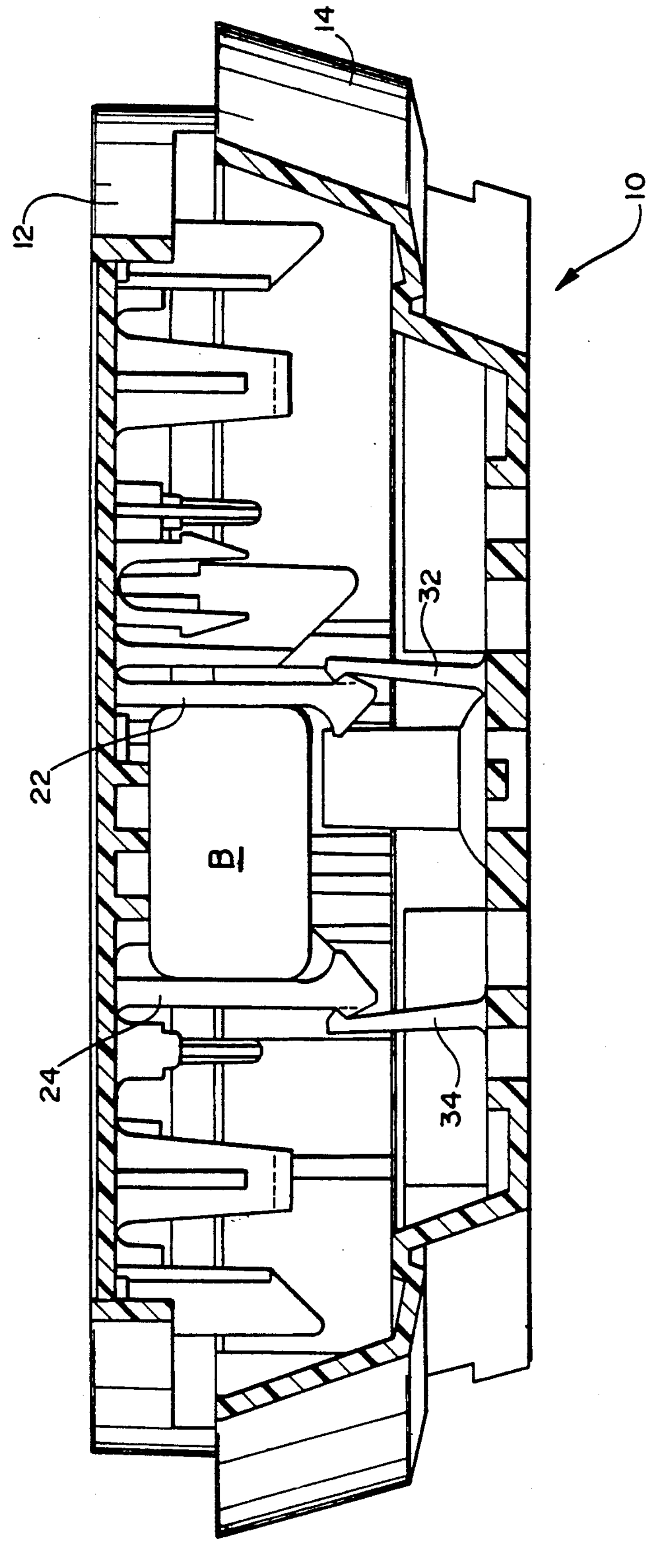
FIG. 4 is an enlarged view partly in section illustrating the interrelationships of the locking mechanism in the presence of a battery.

As illustrated in FIG. 4, when the battery B is inserted into the battery retaining region 18 between the retaining members 22 and 24, the free second ends **22*b*, 24*b* of each member are deflected in response to the presence of the battery B toward a respective one of the cover locking members 32 and 34. The degree of deflection of the members 22 and 24 which is brought about by the battery B is extensive enough such that when the cover 14 is then closed on the base 12, deflecting surfaces 26*c* and 28*c* of the respective battery retaining members 22 and 24 slidably engage respective deflecting surfaces 36***c* and 38*c* of the cover locking members 32 and 34. These two sets of respective surfaces slide against one another as the cover 14 approaches the base 12. This cooperative interaction in turn forces the respective free ends 32*b* and 34*b* of the cover locking members 32 and 34 outwardly away from the battery retaining members 22 and 24.

When the cover 14 is essentially closed against the base 12, the locking surfaces 26*b* and 28*b* of the battery retaining members 22 and 24 slidably engage the locking surfaces 36*b* and 38*b* of the cover locking members 32 and 34 as illustrated in FIG. 3. To this condition the cover 14 will be locked to the base 12. This provides a visual indication that the battery B is present in the detector 10.

As illustrated in FIG. 4, in the closed and locked condition, the battery retaining members 22 and 24 are essentially perpendicular with respect to the surface 16*a*. The cover locking members 32 and 34 in contradistinction are deflected outwardly with respect to the battery B and form an acute angle with respect to the surface 14*a*.

The cover 14 can be opened by pulling a region 14*a* away from the base 12. This pulling force in turn causes the locking surfaces 26*b* and 28*b* to disengage the locking surfaces 36*b* and 38*b*.

It is understood, of course, that the battery B would be coupled to circuitry of the type disclosed in the '695 or '044 patents noted previously for the purpose of powering the detector 10 or providing back-up power thereto.

In an alternate embodiment, where a detector is to be attached to a mounting bracket as opposed to directly to a mounting surface, a missing battery indicator can also be provided. In this embodiment, the missing battery indicator is operative to inhibit the coupling of the detector to the mounting bracket in the absence of the battery.

Figure 5:
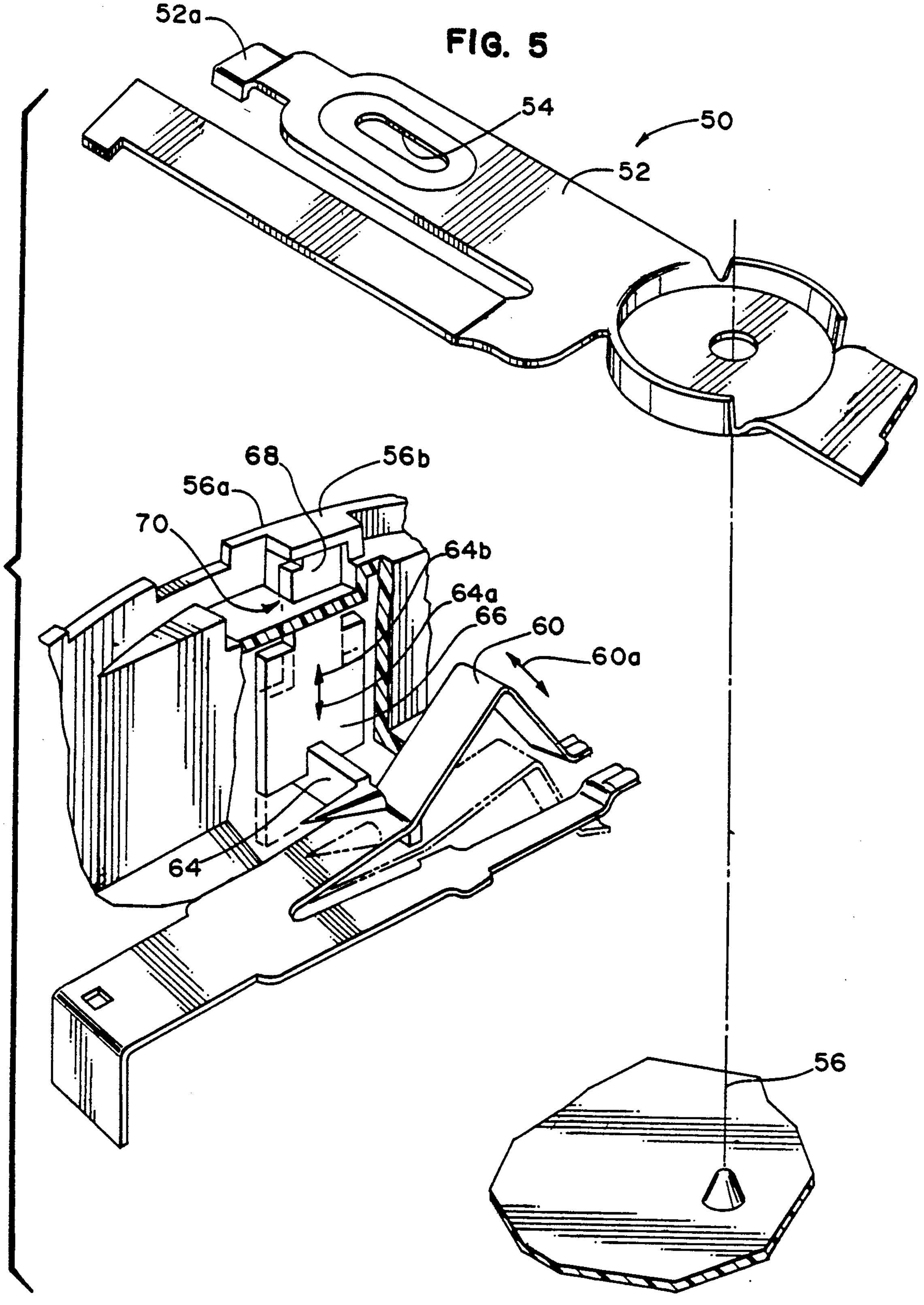
FIG. 5 is an enlarged fragmentary view, partially broken-away, of an alternate smoke detector in accordance with the present invention.

FIG. 5 illustrates a portion of a bracket mountable smoke detector 50. The detector 50 includes a bracket 52 which can be attached to a wall or a ceiling surface via screws or other such fasteners via openings 54.

The intent of the bracket 52 is to provide an easily mountable member to which the base of the detector 50 can be coupled using a rotary motion. A portion of the base 56 is illustrated in FIG. 5. The base 56 could be analogous to the base 12, with the difference that it is intended to be mounted on the bracket 52 as opposed to directly mounting on a ceiling or wall surface.

A peripheral portion 56*a* of the base 56 is illustrated in FIG. 5. The base 56 in a non-movable battery receiving region carries a deflectable spring member 60. The spring member 60 can be moved axially with respect to the cylindrical base 56 as indicated at 60*a* by inserting a battery B into the battery receiving region 62. In response to the inserted battery, the spring member 60 is deflected away from a surface 56*b* of the base 56.

Coupled to the spring member 60 is an extension arm 64. As the spring member 60 moves in response to the inserted battery, the extension arm 64 is carried therewith. Coupled to the extension arm 64 is a blocking member 66 which carries a blocking extension 68. The blocking extension 68 moves in a first direction 64*a*, in response to a battery being inserted, which is away from the upper peripheral surface 56*b*. When the battery is removed, the spring 60 returns to its resting position and the member 68 moves in the opposite direction, in a direction 64*b* toward the upper peripheral surface 56*b*. In this condition, the member 68 extends into and closes a portion of a region 70.

Figure 7:
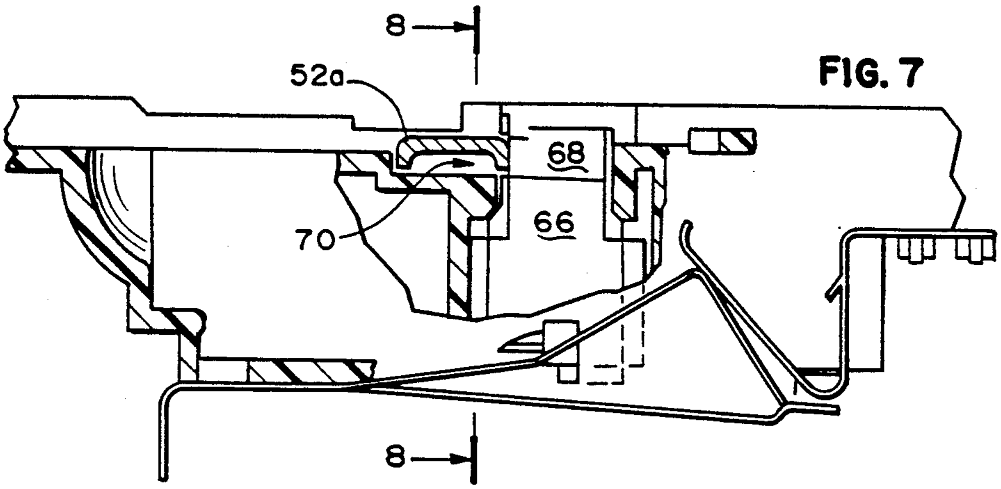
FIG. 7 is a view partly in section taken along plane 7–7 of FIG. 6.
Figure 8:
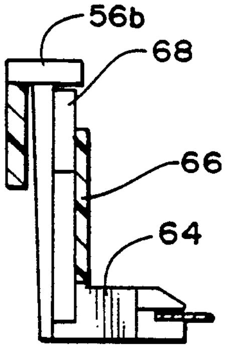
FIG. 8 is a view partly in section taken along plane 8—8 of FIG. 7.
Figure 6:
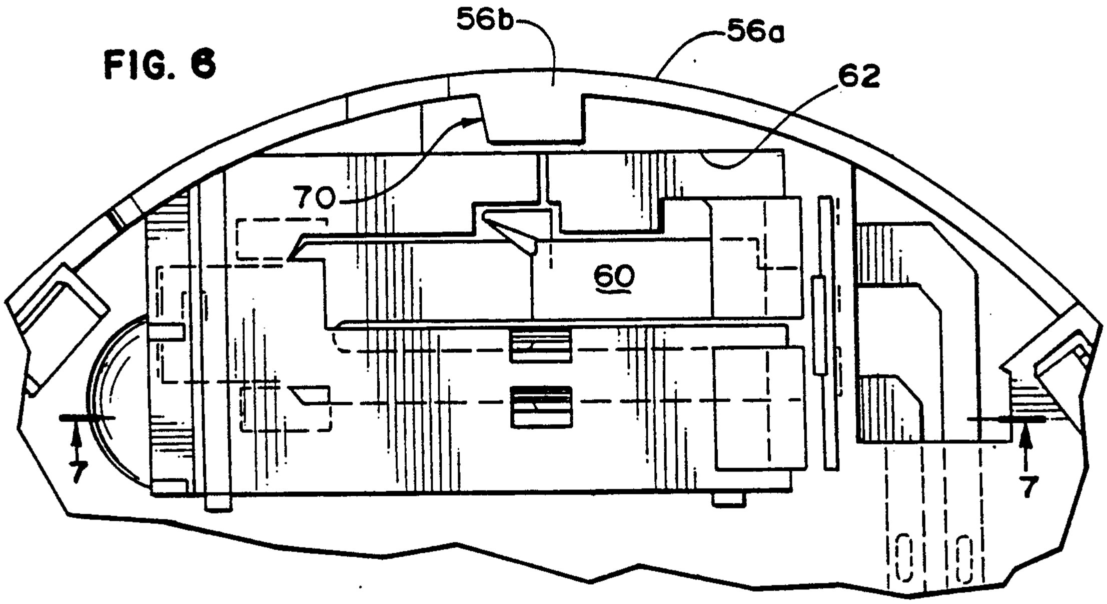
FIG. 6 is a top plan view of a portion of the base of the detector of FIG. 5.
Figure 10:
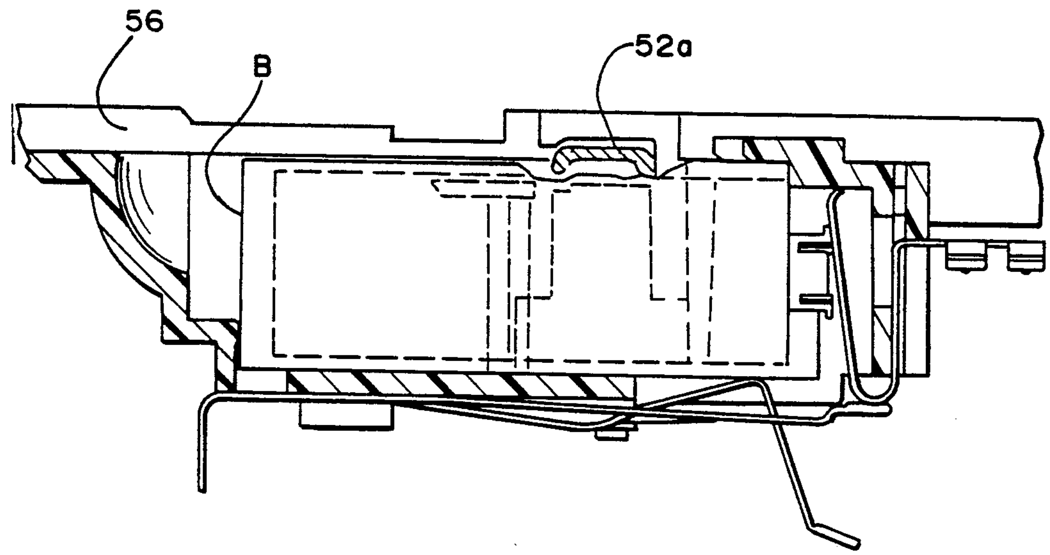
FIG. 10 is a view partly in section taken along plane 10—10 of FIG. 9.
Figure 9:
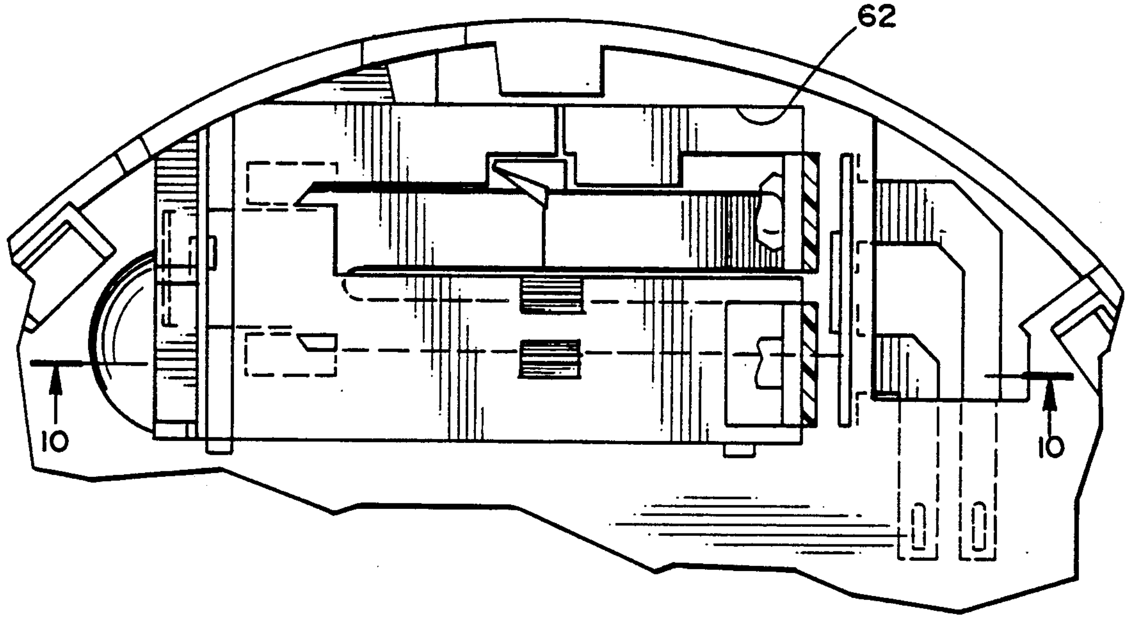
FIG. 9 is a top plan view of a portion of the base of the smoke detector of FIG. 5 with an installed battery.

FIGS. 6, 7 and 8 illustrate the mechanism of the detector 50 in FIG. 5 when the battery B is absent from the battery receiving region 52. FIGS. 9 and 10 illustrate a portion of the base 56 when the battery B illustrated in phantom in FIG. 9, has been inserted into the battery retaining region 62. When the battery B has been inserted into the battery retaining region 62, as discussed previously, the member 68 is retracted in the direction 64*a*, thereby completely opening the region 70. In this instance, an extension finger 52*a* of the bracket 50 can be rotatably and slidably inserted into the region 70, thereby locking the base 56 to the bracket 52. In contradistinction, when the battery B is not present in the battery receiving region 52 and the member 68 is moved upwardly in the direction 64*b* thereby blocking at least in part the region 70, the extension 52*a* is unable to enter the region 70 thereby blocking the detector from being locked to the bracket 52, notwithstanding the fact that the detector base 56 can be positioned against the bracket 52 as it normally would be. In this instance, twisting the base 56 is not effective to lock the base to the bracket 52 in view of the fact that the region 70 has been blocked by the member 68.

In yet another embodiment, in addition to providing a visual indication of the presence or absence of a battery, it is possible to determine whether or not the battery B has been correctly inserted into the detector. FIG. 7 illustrates a detector 80 which utilizes a battery B at least for powering the detector in part. The detector 80 can be the same type of detector which is directly surface mountable using a base 82 as illustrated in FIGS. 1–4. Alternately, the detector 80 could be a bracket mounted type as illustrated in FIGS. 5–10. In this instance, the base 82 would have a region corresponding to the region 70 into which the member 68 can move so as to block the coupling of the mounting bracket, such as the bracket 52 to the base 82.

Figure 11:
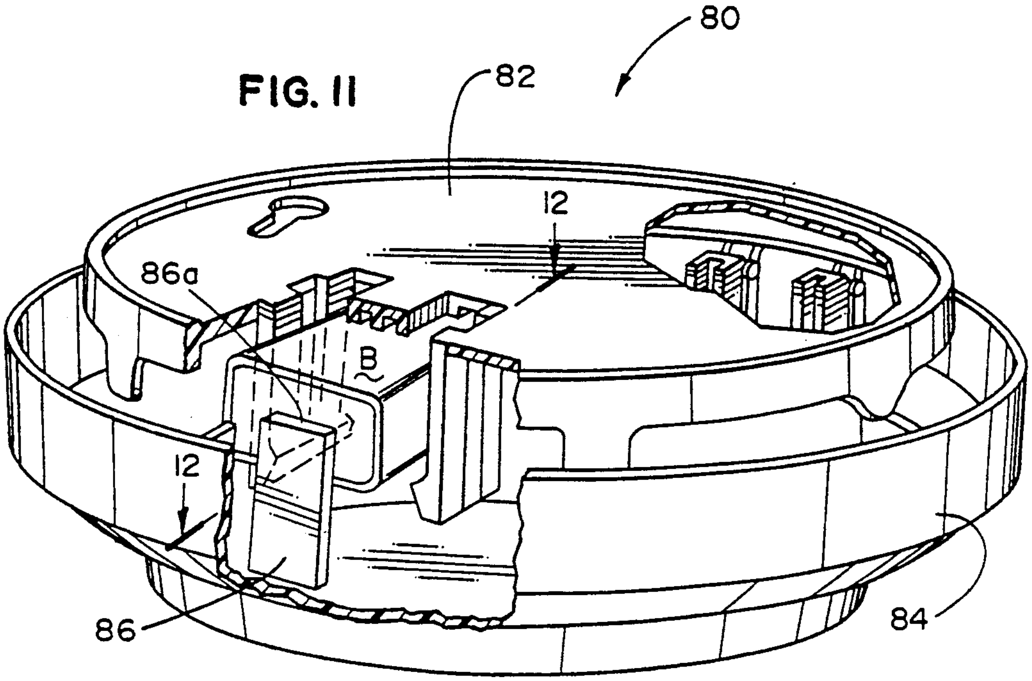
FIG. 11 is a perspective view, partially broken-away, of a smoke detector incorporating yet another embodiment of the present invention.

With respect to FIG. 11, coupled to the base 82 is a cover 84. The cover 84 carries a battery-sensing extension member 86. The member 86 can be integrally molded with the cover 84 simultaneously with formation of the cover.

Figure 12:
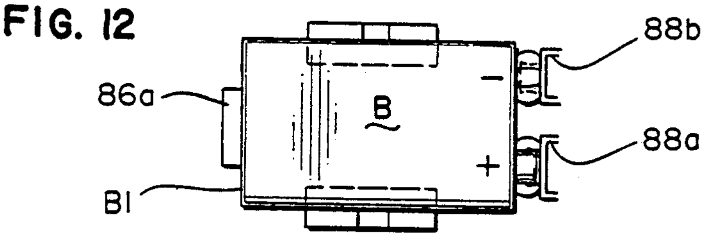
FIG. 12 is a top plan view of a properly inserted battery illustrating the relationship with the terminals thereof.
Figure 13:
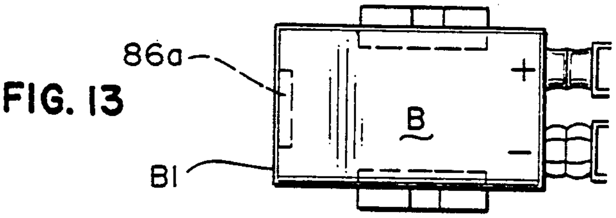
FIG. 13 is top plan view of an improperly inserted battery.
Figure 14:
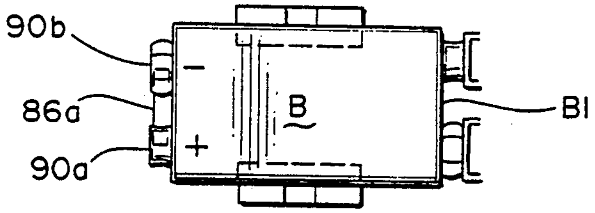
FIG. 14 is a top plan view of another improperly inserted battery.

As illustrated in FIGS. 12–14, the member 86 is effective to detect the battery B properly coupled to connectors 88*a* and 88*b* in the detector 80. When the battery B is properly coupled to connectors 88*a* and 88*b* and the cover 84 is closed against the base 82, the member 86 will pass adjacent an end region B1 of the battery B, permitting the cover 84 to be locked closed. In the instance where the battery B is present in the base 82 but has not been properly engaged with the connectors 88*a* and 88*b*, as illustrated in FIG. 13, the battery B extends from the connectors 88*a* and 88*b* an additional distance such that the member 86 is blocked by the end region B1 of the battery. In this instance, the cover 84 cannot be locked closed against the base 82. In a similar instance, if the battery B is inserted into the base 82 backwards such that the end region B1 is adjacent the connectors 88*a* and 88*b*, the end surface 86*a* of the member 86 is obstructed by the terminals 90*a* and 90*b* of the battery. Hence, the cover 84 cannot be latched closed and locked to the base 82 in this instance either. Thus, the member 86 provides a sensing mechanism which makes it impossible to lock the cover closed when the battery is present in the unit but is improperly inserted therein.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An electrical unit with an openable cover, the unit powered at least in part by a battery receivable within a non-movable region thereof and with a battery missing indicator comprising:

a structure for locking said cover to the unit with said structure including at least one elongated, battery retaining locking member having first and second ends with said first end affixed to the unit and with said second end carrying cover engaging means said second end being deflectable from a cover non-engaging position to a cover engaging position in response to the presence of the battery.

2. An electrical unit in claim 1 with said cover including a member for coupling to said engaging means.

3. An electrical unit as in claim 2 with said engaging means comprising a laterally extending locking projection.

4. An electrical unit as in claim 1 with said structure including a second elongated locking member having a first and a second end, spaced from said one elongated locking member, with the battery receivable therebetween.

5. An electrical unit as in claim 4 with said second ends deflectable away from one another in response to the battery being positioned therebetween.

6. An electrical unit as in claim 5 with said second ends carrying means engageable with said cover only when deflected away from one another.

7. An electrical unit with an openable cover, the unit powered at least in part by a battery receivable within a non-movable region thereof and with a battery missing indicator comprising:

a structure for locking said cover to the unit;

means for sensing the presence or the absence of the battery; and means for inhibiting said locking function in response to the absence of the battery with said structure including at least one elongated locking member having first and second ends with said first end affixed to the unit and with said second end carrying cover engaging means and including means for detecting a battery that is present but not properly coupled to the unit.

8. An electrical unit, powered at least in part by a battery, comprising:

a surface mountable base;

a battery receiving region on said base fixed with respect thereto;

an openable cover for the unit;

means for locking said cover to the unit;

means for detecting the presence or the absence of the battery;

means for inhibiting said locking means in response to the absence of the battery with said locking means including at least one elongated, deflectable, locking member with a first end affixed to said base adjacent said battery receiving region and with a second end extending therefrom with said second end carrying cover engaging means and with said locking member deflectable from an inoperative locking position to an operative locking position in response to the presence of the battery.

9. An electrical unit as in claim 8 with said engaging means carrying a laterally extending locking projection.

10. An electrical unit as in claim 9 with said cover carrying means for slidably engaging said locking projection.

11. An electrical unit as in claim 8 with said locking means including a second elongated locking member having a first end and a second end, spaced from said one elongated locking member, with the battery receivable therebetween.

12. An electrical unit as in claim 11 with said second ends deflectable away from one another in response to the battery being positioned therebetween.

13. An electrical unit as in claim 12 with said second ends carrying means engageable with said cover only when deflected away from one another.

14. An electrical unit, powered at least in part by a battery, comprising:

a surface mountable base;

a battery receiving region on said base fixed with respect thereto;

an openable cover for the unit;

means for locking said cover to the unit;

means for detecting the presence or the absence of the battery; and means for inhibiting said locking means in response to the absence of the battery with said locking means including at least one elongated, deflectable, locking member with a first end affixed to said base adjacent said battery receiving region and with a second end extending therefrom with said second end carrying cover engaging means and including means for sensing a battery that is present but not properly coupled to the unit.

15. An electrical unit as in claim 14 with said sensing means including a generally planar member with a first end affixed to said cover and with a second, battery engageable, end extending therefrom.

16. A battery powered, electrical unit with a missing battery indicator comprising:

a base mountable on a selected surface and with a separate part engageable therewith in at least one locking region defined thereon;

a battery receiving region on said separate part;

means, on said separate part, for sensing the presence or absence of the battery; and means for closing said locking region in response to the absence of the battery thereby preventing engagement of said part with said base.

17. An electrical unit with an openable cover, the unit powered at least in part by a battery receivable within a non-movable region of the unit comprising:

means for locking said cover to the unit;

means for detecting the presence or the absence of the battery; and means for inhibiting said locking means in response to the absence of the battery with said locking means including at least one elongated locking member having first and second ends with said first end affixed to the unit and with said second end carrying cover engaging means and with said cover including a member for coupling to said engaging means.

18. An electrical unit in claim 17 with said cover including a member for coupling to said engaging means.

19. An electrical unit as in claim 18 with said engaging means comprising a laterally extending locking projection.

20. An electrical unit as in claim 17 including means for sensing a battery that is present but not properly coupled to the unit.

21. An electrical unit as in claim 17 with said locking means including a second elongated locking member, having a first end and a second end, spaced from said one elongated locking member, with the battery receivable therebetween.

22. An electrical unit as in claim 21 with said second ends deflectable away from one another in response to the battery being positioned therebetween.

23. An electrical unit as in claim 22 with said second ends carrying means engageable with said cover only when deflected away from one another.

24. A two-part battery powered electrical unit affixable to a surface comprising:

a base affixable to the surface;

a housing, separate from said base, with a battery receiving region said housing defining a locking slot;

means, carried partly on said base and partly on said housing for removably coupling said housing to said base using said slot; and a blocking mechanism, carried by said housing, for blocking said slot thereby preventing coupling of said housing to said base in the absence of the battery.

* * * * *